US008059096B2

(12) United States Patent
Lim et al.

(10) Patent No.: US 8,059,096 B2
(45) Date of Patent: Nov. 15, 2011

(54) MOBILE TERMINAL AND OUTPUT CONTROLLING METHOD THEREOF

(75) Inventors: Seong-Jae Lim, Seoul (KR); Seung-Geun Lim, Seoul (KR); Min-Soo Kim, Gwangmyeong (KR); Hyun-Woo Yoo, Daegu (KR); Hyung-Gon Ryu, Seoul (KR); Won-Seok Joo, Seoul (KR)

(73) Assignee: LG Electronics Inc., Seoul (KR)

( * ) Notice: Subject to any disclaimer, the term of this patent is extended or adjusted under 35 U.S.C. 154(b) by 991 days.

(21) Appl. No.: 11/765,960

(22) Filed: Jun. 20, 2007

(65) Prior Publication Data

US 2008/0090618 A1 Apr. 17, 2008

(30) Foreign Application Priority Data

Oct. 13, 2006 (KR) .................. 10-2006-0099990

(51) Int. Cl.
*G09G 5/08* (2006.01)
(52) U.S. Cl. .......... 345/169; 345/156; 345/1.1; 455/566
(58) Field of Classification Search .................. 345/169, 345/1.1, 156; 455/566
See application file for complete search history.

(56) References Cited

U.S. PATENT DOCUMENTS

| 6,714,802 | B1* | 3/2004 | Barvesten ................... 455/575.1 |
| 6,747,609 | B2* | 6/2004 | Antila et al. ................. 345/1.1 |
| 6,798,882 | B2* | 9/2004 | Kupiainen ................. 379/433.04 |
| 6,885,318 | B2* | 4/2005 | Bickerton ...................... 341/22 |
| 7,142,195 | B2* | 11/2006 | Northway et al. ............. 345/169 |
| 7,337,549 | B2* | 3/2008 | Cho et al. ...................... 33/356 |
| 7,352,361 | B2* | 4/2008 | Yi .................................. 345/158 |
| 7,411,579 | B2* | 8/2008 | Tsuji et al. .................... 345/158 |
| 7,636,071 | B2* | 12/2009 | O'Gorman ..................... 345/1.1 |
| 2002/0180767 | A1* | 12/2002 | Northway et al. ............. 345/698 |
| 2004/0108968 | A1* | 6/2004 | Finke-Anlauff .............. 345/1.1 |
| 2004/0254001 | A1 | 12/2004 | Kakuguchi et al. |
| 2005/0017953 | A1* | 1/2005 | Pekka ........................... 345/169 |
| 2005/0044510 | A1* | 2/2005 | Yi .................................. 715/864 |
| 2005/0090206 | A1* | 4/2005 | Hyun et al. ................... 455/90.3 |
| 2005/0140565 | A1 | 6/2005 | Krombach |
| 2005/0150122 | A1* | 7/2005 | Cho et al. ...................... 33/356 |
| 2005/0266897 | A1* | 12/2005 | Ahn et al. ................... 455/575.1 |
| 2007/0057917 | A1* | 3/2007 | Bae ............................... 345/158 |
| 2007/0081638 | A1* | 4/2007 | Taneya et al. .............. 379/88.11 |
| 2007/0109276 | A1* | 5/2007 | Kim et al. ..................... 345/173 |
| 2007/0120762 | A1* | 5/2007 | O'Gorman ..................... 345/1.1 |

(Continued)

FOREIGN PATENT DOCUMENTS

DE 10156916 A1 6/2003

(Continued)

*Primary Examiner* — Bipin Shalwala
*Assistant Examiner* — Afroza Chowdhury
(74) *Attorney, Agent, or Firm* — Birch, Stewart, Kolasch & Birch, LLP (57) ABSTRACT

A mobile terminal including a main body having a wireless communication module, a first display module disposed on a front surface of the main body and configured to display first information, a first input unit disposed on the front surface of the main body and configured to input first information into the mobile terminal, a second display module disposed on a rear surface of the main body and configured to display second information, and a control unit configured to control the wireless communication module, the first and second display modules, and the first input unit.

18 Claims, 5 Drawing Sheets

| U.S. PATENT DOCUMENTS | | | | |
|---|---|---|---|---|
| 2007/0232336 A1* | 10/2007 | Kim et al. | | 455/466 |
| 2008/0004085 A1* | 1/2008 | Jung et al. | | 455/566 |
| 2008/0125181 A1* | 5/2008 | Yoon | | 455/566 |
| 2008/0246731 A1* | 10/2008 | Chechelniker | | 345/168 |
| 2009/0227268 A1* | 9/2009 | Sorensson et al. | | 455/456.2 |

| FOREIGN PATENT DOCUMENTS | | |
|---|---|---|
| EP | 1548492 A1 | 6/2005 |
| EP | 1640791 A1 | 3/2006 |
| WO | WO-03/071769 A1 | 8/2003 |

* cited by examiner

MOBILE TERMINAL AND OUTPUT CONTROLLING METHOD THEREOF

CROSS-REFERENCE TO A RELATED APPLICATION

The present application claims priority to Korean Application No. 10-2006-0099990, filed in Korea on Oct. 13, 2006, which is hereby incorporated by reference in its entirety.

BACKGROUND OF THE INVENTION

1. Field of the Invention

The present invention relates to a mobile terminal including a display module and a method of controlling the same.

2. Description of the Background Art

Mobile communication terminals perform a variety of additional functions besides the basic call function. That is, users can play music, watch videos, take pictures, access the Internet, send emails and text messages, etc. For example, a user can take a picture with a camera function, and then view the picture on the display of the terminal before emailing the picture to another terminal. The user can also watch a broadcast program or other video on the display.

However, mobile terminals are compact in size and include additional keypads and other input devices needed to input information (e.g., phone numbers, etc.) into the terminal. Thus, the display screen is relatively small, making it more difficult for users to view information on the display.

SUMMARY OF THE INVENTION

Accordingly, one object of the present invention is to address the above-noted and other objects.

Another object of the present invention is to provide a mobile terminal having an enlarged display screen.

Yet another object of the present invention is to control display functions based on an arrangement state of a mobile terminal.

To achieve these and other advantages and in accordance with the purpose of the present invention, as embodied and broadly described herein, the present invention provides in one aspect a mobile terminal including a main body having a wireless communication module, a first display module disposed on a front surface of the main body and configured to display first information, a first input unit disposed on the front surface of the main body and configured to input first information into the mobile terminal, a second display module disposed on a rear surface of the main body and configured to display second information, and a control unit configured to control the wireless communication module, the first and second display modules, and the first input unit.

In another aspect, the present invention provides a mobile terminal including a first housing through which a first display module and a first input unit are exposed, a second housing through which a second display module is exposed, a printed circuit board assembly disposed at an inner space formed by the first and second housings and configured to electrically control the first and second display modules and the first input unit, and a power supplying unit disposed at the inner space and configured to supply power to the printed circuit board assembly.

In still another aspect, the present invention provides a method of controlling a mobile terminal. The method includes sensing an arrangement state of the mobile terminal, and controlling outputs of first and second display modules according to the sensed arrangement state.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE INVENTION

Reference will now be made in detail to the preferred embodiments of the present invention, examples of which are illustrated in the accompanying drawings.

Figure 1:
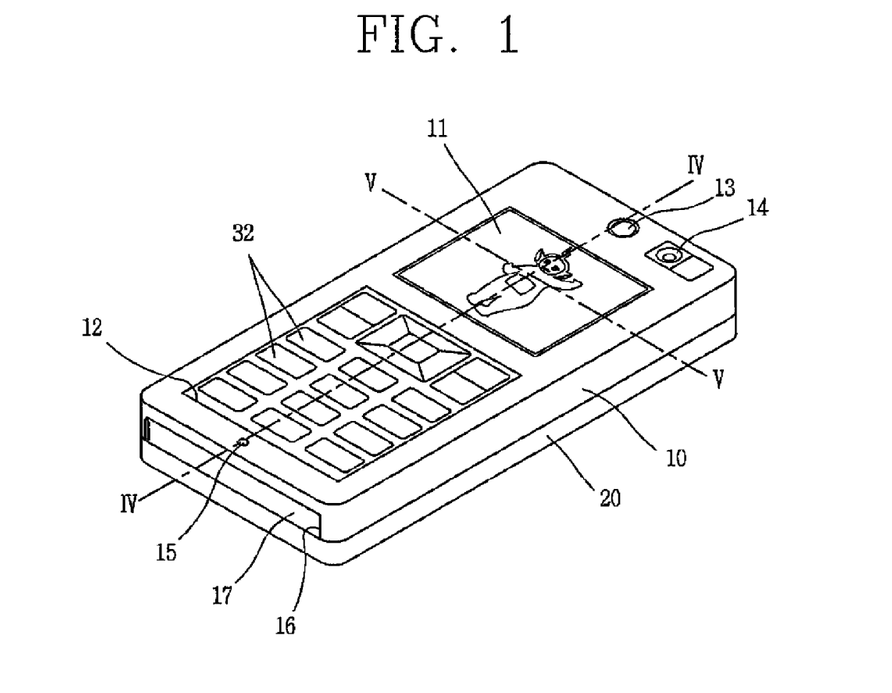
FIG. 1 is a perspective view illustrating a front surface of a mobile terminal in accordance with an embodiment of the present invention.

As shown FIG. 1, the mobile terminal in accordance with an embodiment of the present invention includes a first housing 10 that forms the front surface of the terminal. In addition, the first housing 10 is coupled to a second housing 20 that forms the rear surface of the terminal. The mobile terminal also includes a wireless communication unit and corresponding antenna (not shown) for wirelessly communicating with other terminals.

The terminal also includes a first window 11 through which a user views information formed or disposed at an upper portion of the front surface of the first housing 10. A first input unit 32 is also disposed on a lower portion of the front surface of the first housing 10. Further, the first input unit 32 is exposed through a mounting portion 12 formed at a lower portion of the first housing 10.

Thus, a user can input information such as characters, symbols, numbers, directions, other specific function(s), etc. into the terminal. Further, the first input unit 32 can be a keypad including key buttons and dome switches or can be a touch type input unit including a touch pad. Alternatively, the first input unit 32 can be a touch screen disposed under the first window 11 so that the illustrated keys of the first input unit 32 are only shown in an input mode. In addition, the first input unit 32 includes, for example, numerical keys, alphabetical keys, functional keys and directional keys.

As shown in FIG. 1, the terminal also includes a first sound discharge hole 13 and a camera hole 14 formed at a top end of the first housing 10 for discharging sound and photographing images, respectively. A microphone hole 15 is also formed at a bottom end of the first housing 10 for inputting sound to the main body. In addition, an opened portion 16 is formed on the one of side surfaces of the first housing 10 (connected to the front surface).

The terminal also includes a door 17 movably mounted on a side surface of the first housing 10 on which the opened portion 16 has been formed. That is, the door 17 is rotatably or slidably mounted on the side for opening and closing the opened portion 16 by a rotation or a sliding operation. The opened portion 16 can be formed on the second housing 20 or over the first and second housings 10 and 20.

Figure 2:
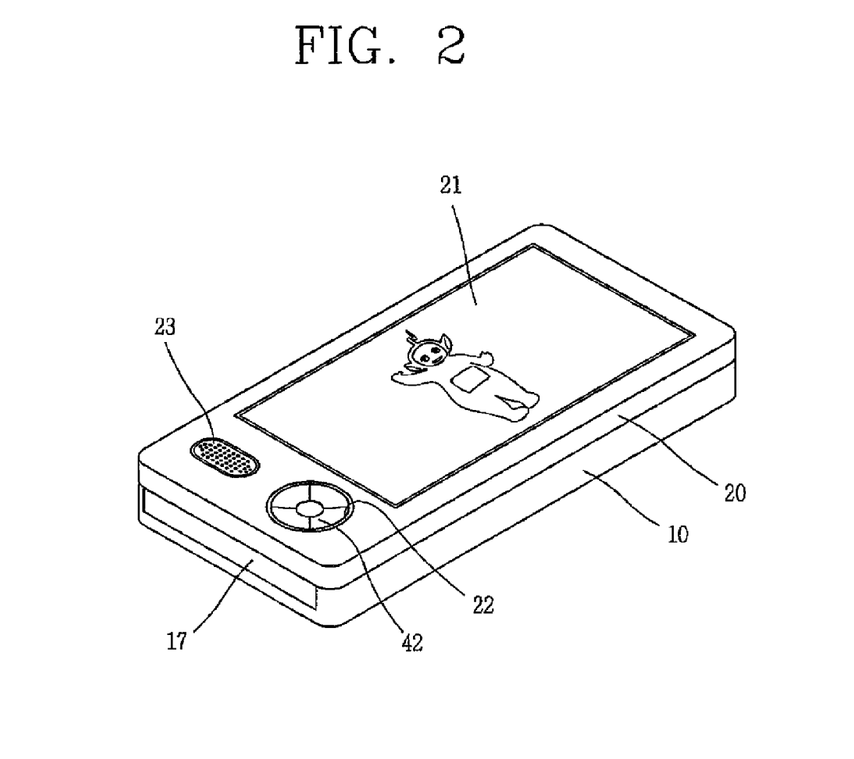
FIG. 2 is a perspective view illustrating a rear surface of the mobile terminal of FIG. 1.

Next, as shown in FIG. 2, a second window 21 is formed on the second housing 20 that forms the rear surface of the main body. The second window 21 preferably has a size that is substantially identical to that of the second housing 20. The terminal also includes a mounting hole 22 formed near the second window 21 so as to receive a second input unit 42 that is externally exposed so that the user can input a command for controlling a second display module 41 (see FIG. 3) by controlling the second input unit 42.

In addition, the second input unit 42 includes various types of keys like the first input unit 11, but preferably only includes one of the functional keys and the directional keys (and doesn't include the numerical or alphabetical keys). Therefore, the second input unit 42 has an input area smaller than that of the first input unit 11. In addition, if the second window 21 is a touch screen, the numerical and alphabetic keys may be displayed on the second window 21 during an input mode. As shown in FIG. 2, the terminal also includes a second sound discharge hole 23 (e.g., a speaker) formed near the mounting hole 22 for discharging sound from the terminal.

Figure 3:
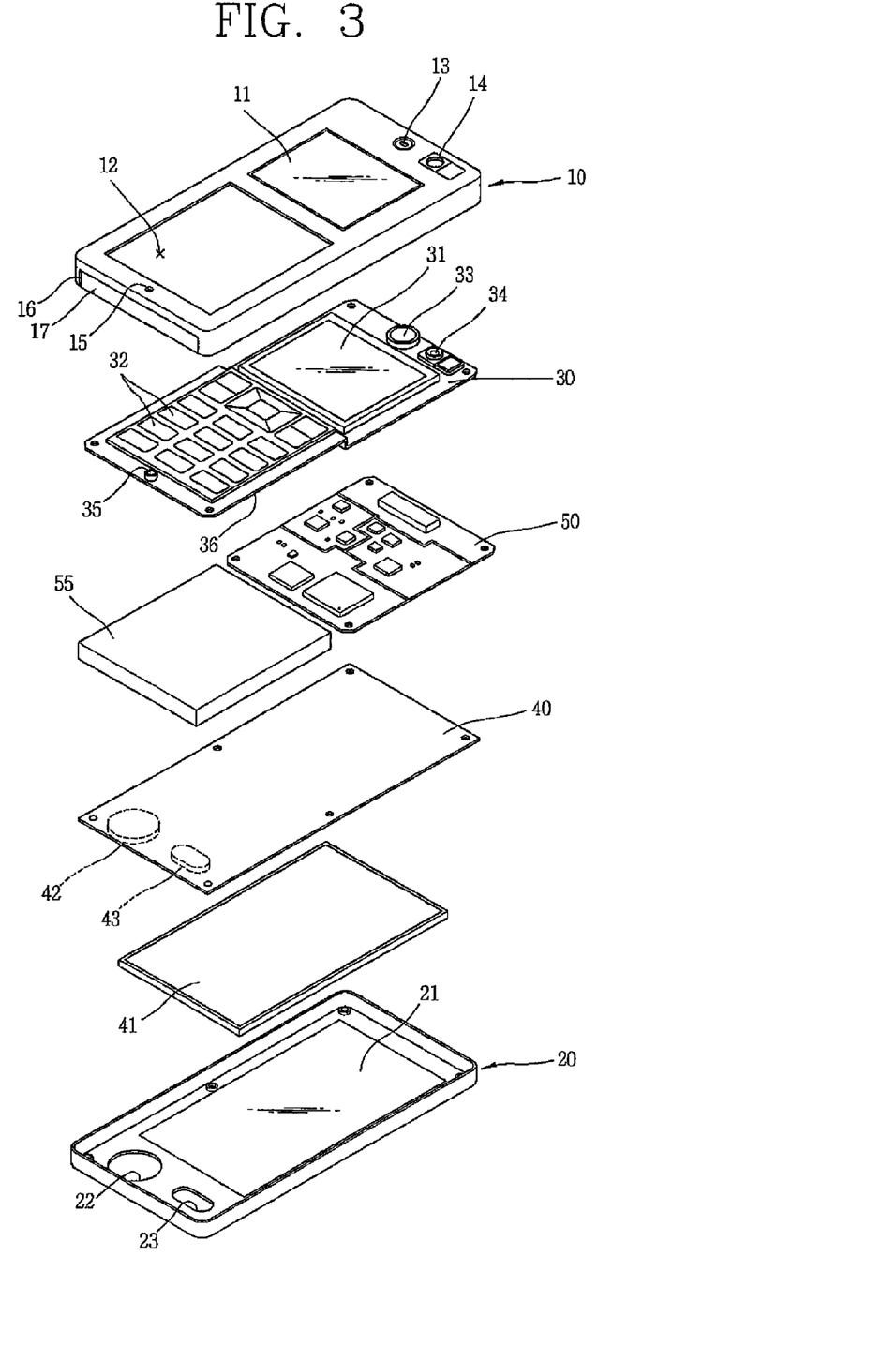
FIG. 3 is a disassembled perspective view illustrating a structure of the mobile terminal of FIG. 1.

Next, FIG. 3 is an exploded perspective view of the structure of the mobile terminal of FIG. 1. As shown in FIG. 3, the first window 11 and a mounting portion 12 are formed or disposed on the first housing 10. Also, the first sound discharge hole 13, the camera hole 14 and the microphone hole 15 are formed on the first housing 10. Furthermore, the opened portion 16 is formed on the first housing 10, and the door 17 is movably mounted thereon.

In addition, a first frame 30 is formed in a plate shape and made of an injection-molded material or metal. A first speaker module 33 and a camera module 34 are mounted on a top end of the surface of the first frame 30 facing the first housing 10 so as to correspond to the first sound discharge hole 13 and the camera hole 14 of the first housing 10, respectively. A first display module 31 for displaying visual information is mounted on a large area of an upper portion of the first frame 30. Further, the first display module 31 can be a Liquid Crystal Display (LCD) module or an Organic Light Emitting Diodes (OLED) module, etc. The visual information includes all information which the user can see such as characters, images and moving pictures.

In addition, the first input unit 32 is mounted on a lower portion of the first frame 30. Also, a microphone module 35, is mounted on a lower portion of the first input unit 32 so as to correspond to the microphone hole 16 of the first housing 10. Further, as shown in FIG. 3, a center portion of the first frame 30 (a boundary portion between the first display module 31 and the first input unit 32) is bent. A power supplying unit receiving portion 36 is formed at a rear portion of the first frame 30 bent toward the first housing 10. A power supplying unit such as a battery 55 is then inserted into the opened portion 16 through the door 17 and stably positioned in the receiving portion 36.

A printed circuit board assembly 50 is formed by mounting various electronic components for communication and electric control of the terminal on a printed circuit board. The printed circuit board assembly 50 is referred to as a control unit in an aspect of controlling the terminal. Further, the battery 55 is electrically connected to the printed circuit board assembly 50 for supplying power to the printed circuit board assembly 50. That is, the power from the battery 55 is supplied to various electronic components such as the first display module 31 and the first input unit 32 under the control of the printed circuit board assembly 50. In addition, as shown in FIG. 3, the printed circuit board assembly 50 and the battery 55 are disposed between the first frame 30 and the second frame 40.

In the same manner as the first frame 30, the second frame 40 is also formed in a plate shape. The second display module 41 is then mounted on a surface of the second frame 40 facing the second housing 20. In the same manner as the first display module 31, the second display module 41 is an LCD module or other type of display module. Further, the second display module 41 has a viewing direction substantially opposite to that of the first display module 31.

In addition, as shown in FIG. 3 1 the second display module 41 has a display area larger than that of the first display area 31. Accordingly, the second display module 41 outputs images larger than the first display module 31. Further, a second input unit 42 and a second speaker module 43 are mounted on a lower portion of the second frame 40. The second housing 20 is coupled to the first housing 10 so as to cover the second display module 41.

Also, the second window 21 through which the user can view images from the second display module 41 is mounted on the second housing 20. The mounting hole 22 for externally exposing the second input unit 42 is formed near the second window 21. In addition, the second sound discharge hole 23 for outputting the sound generated in the second speaker module 43 is also be formed near the second window 21.

Figure 4:
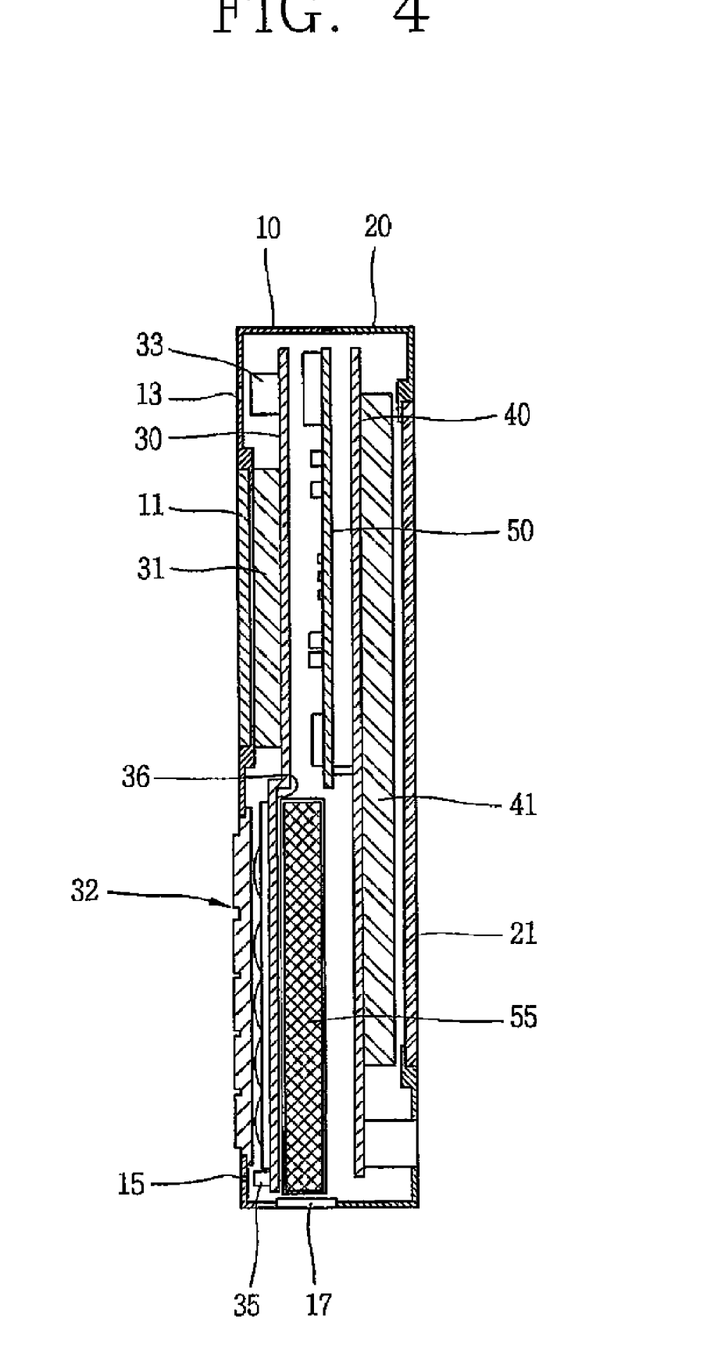
FIG. 4 is a longitudinal-sectional view taken along line 'IV-IV' of the mobile terminal of FIG. 1.

Next, FIG. 4 is a longitudinal-sectional view taken along line 'IV-IV' of the mobile terminal of FIG. 1. As shown in FIG. 4, an upper portion of the first frame 30 is bent toward the second housing 20 so that the first display module 31 that is thicker than the input unit 32 can be mounted thereon. Further, the battery 55 is inserted into the receiving portion 36 relatively widened from the second frame 40 by bending the first frame 30. The battery 55 can then be inserted into or taken out of the terminal by opening and closing the opened portion 16 by operating the door 17.

In addition, the printed, circuit board assembly or control unit 50 is electrically connected to the first and second display modules 31 and 41, the first and second speaker modules 33 and 43 (refer to FIG. 3), the camera module 34 and the microphone module 35 for electrically controlling the aforementioned members. Such electrical connection is implemented using, for example, an electric cable or a Flexible Printed Circuit Board (FPCB).

Therefore, the user can recognize, through the first window 11, the visual information outputted from the first display module 31 under the control of the printed circuit board assembly 50. In addition, the user can recognize the visual information outputted from the second display module 41 through the second window 21.

Figure 5:
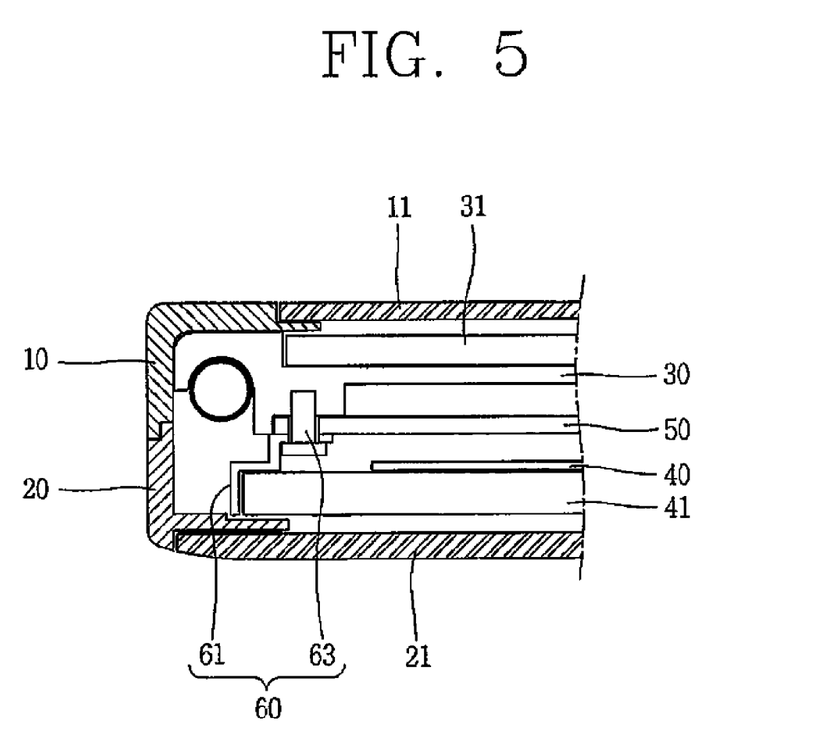
FIG. 5 is a cross-sectional view taken along line 'V-V' of the mobile terminal of FIG. 1.

FIG. 5 is a cross-sectional view taken along line 'V-V' of the mobile terminal of FIG. 1. As shown in FIG. 5, one end of a coupling member 61 is coupled to a side surface of the second display module 41 by an adhesive or an adhesive tape, for example. The other end of the coupling member 61 is coupled to the printed circuit board assembly 50 and the first frame 30 by a screw 63. The coupling member 61 and the screw 63 are referred to as a coupling unit 60.

Accordingly, the first frame 30 (and the mounted components such as the first display module 31 and the input unit 32), the printed circuit board assembly 50 and the second frame 40 (and the mounted components such as the second display module 41 and the second input unit 42) are integrated to form a single assembly.

Figure 6:
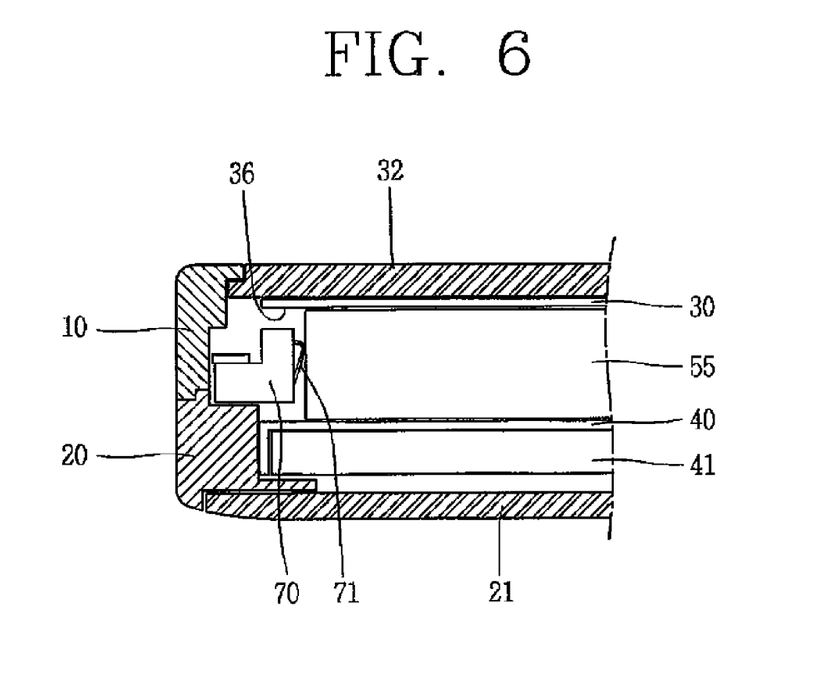
FIG. 6 is a cross-sectional view taken along line 'VI-VI' of the mobile terminal of FIG. 1.

FIG. 6 is a cross-sectional view taken along line 'VI-VI' of the mobile terminal of FIG. 1. As shown in FIG. 6, the battery 55 is mounted on the receiving portion 36 between the first frame 30 and the second frame 40. Further, to electrically connect the battery 55 to the printed circuit board assembly 50, a connector 70 electrically connected to the printed circuit board assembly 50 is disposed on the second housing 20. Also, a terminal 71 electrically connected to a second terminal of the battery 55 is protruded from the connector 70. The terminal 71 may be made of a conductive elastic material with its end bent to efficiently contact the terminal of the battery 55.

A method of assembling and using the mobile terminal of the present invention will now be described in more detail. That is, to assemble the mobile terminal, the first display module 31, the first input unit 32, the first speaker module 33, the camera module 34 and the microphone module 35 are mounted on the first frame 30. The second display module 41, the second input unit 42 and the second speaker module 43 are also mounted on the second frame 40.

Further, the first and second frames 30 and 40 are coupled to each other through the coupling unit 60 so as to form a single assembly. In addition, the first and second housings 10 and 20 are coupled to each other to cover both sides of the assembly, thereby forming the main body of the mobile terminal. That is, the first and second housings 10 and 20 are coupled to each other by using screw holes (not shown) passing through the first and second housings 10 and 20 (and the printed circuit board assembly 50, etc.) and screws inserted into the screw holes.

In addition, the first and second housings 10 and 20 can be coupled to each other using hooks or other types of coupling methods. As discussed above, the opened portion 16 is opened by operating the door 17, and the battery 55 is inserted into the receiving portion 36. After the opened portion 16 is closed by operating the door 17, the mobile terminal can be operated.

In the above-described assembly method, the first and second frames 30 and 40 (and the mounted components such as the first and second display modules 31 and 41) and the printed circuit board assembly 50 form a single assembly for easy management. Furthermore, the components are mounted on the first and second frames 30 and 40, respectively. Therefore, the first and second frames 30 and 40 can be individually assembled in two places, thereby reducing the initial assembly time in half. Further, the battery 55 is disposed between the first and second frames 30 and 40. That is, although the first and second display modules 31 and 41 are used, the battery 55 can be disposed without increasing the thickness of the terminal.

In addition, when the user inputs a phone number into the mobile terminal through the first input unit 32, the phone number is displayed on the first display module 31. During a phone call, the user receives the voice of the other party through the first and/or second speaker modules 33 and 43, and inputs his/her voice into the mobile terminal through the microphone module 35. The user can also view visual information output through the first display module 31 such as pictures and moving pictures. In addition, the user can view an image photographed by the camera module 34.

Further, when the user wants to view visual information with a larger size, for example, when the user wants to view moving pictures, the user can use the larger second display window 21 through the second display module 41. Also, while the user is viewing the visual information on the second display window 21, the user can also input the command for controlling the second display module 41 through the second input unit 42. Audio information is also played with the visual information through the second speaker module 43.

In addition, unlike the above explanation, the battery 55 can be fixedly coupled to the main body 10, for example, to the printed circuit board 50. In this instance, a terminal of the battery 55 is exposed through the main body 10 so as to simply contact a charging terminal of a charger. Furthermore, at least of the first and second frames 30 and 40 may not be required. In that case, the first display module 31 and the fist input unit 32, and/or the second display module 41 and the second input unit 42 are disposed or mounted at the printed circuit board 50.

Figure 7:
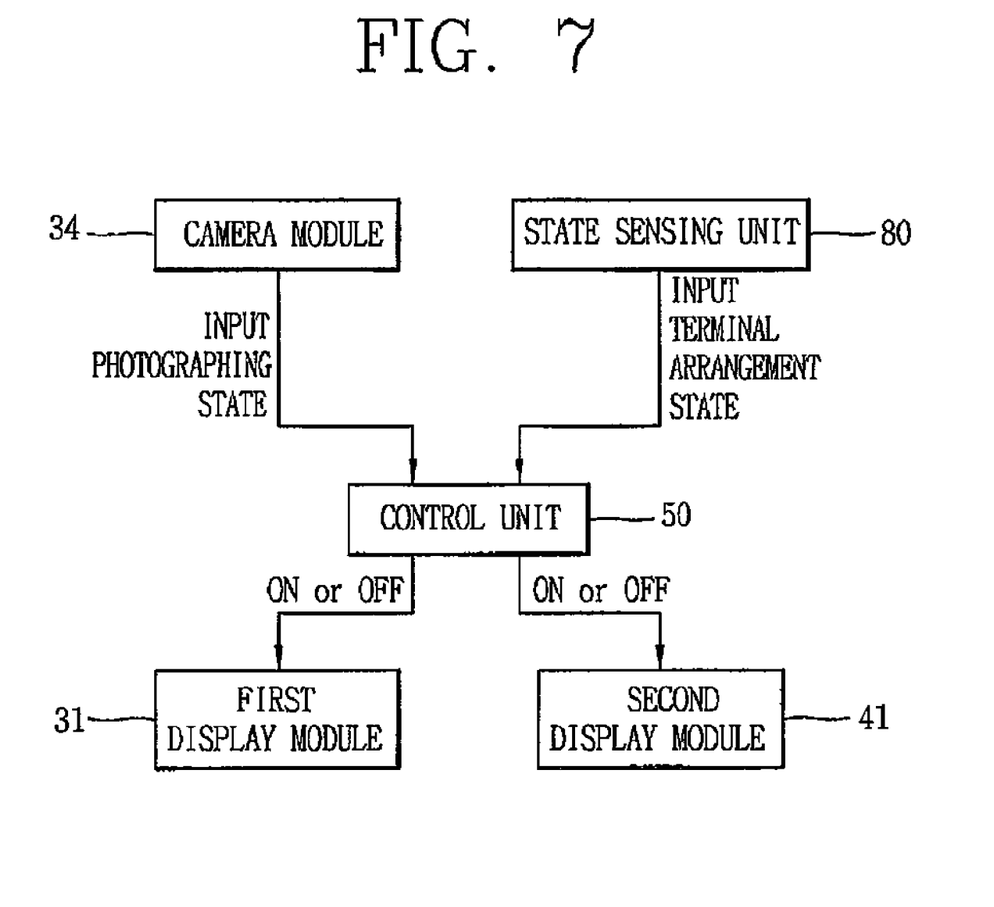
FIG. 7 is a flowchart sequentially illustrating a method for controlling a mobile terminal in accordance with an embodiment of the present invention.

Next, FIG. 7 is a flowchart showing a method for controlling an output of the mobile terminal in accordance with an embodiment of the present invention. As illustrated in FIG. 7, a state sensing unit 80 may be disposed within a main body of the mobile terminal, for distinguishing the arrangement states of the main body, namely, a state of the second housing 20 facing the ground (the first state shown in FIG. 1) and a state of the first housing 10 facing the ground (the second state shown in FIG. 2). The state sensing unit 80 may include a gyro-sensor for sensing the first and second states of the mobile terminal.

In addition, when the control unit 50 receives the arrangement state of the main body of the mobile terminal through the state sensing unit 80, the control unit 50 controls an on/off operation of the first and second display modules 31 and 41 according to the arrangement state. For example, when the mobile terminal is positioned in the first state, the control unit 50 turns on only the first display module 31, and when the terminal is positioned in the second state, the control unit 50 turns on only the second display module 41.

Further, when the camera module 34 is activated for photographing, the control unit 50 turns on both the first and second display modules 31 and 41. When the user wants to photograph himself/herself using the camera module 34, the user can check the image to be photographed through the first display module 31. Also, when the user wants to photograph another person or object, he/she orients the camera module 34 to the person or object. The user can then check the image to be photographed through the second display module 41.

As discussed above, in accordance with an embodiment of the present invention, the mobile terminal uses two display modules for providing an appropriate screen to the user. In addition, because the arrangement of the battery and the two displays is optimized, the thickness of the terminal is not increase due to the two displays.

In addition, when most components are primarily mounted on the first and second frames, the first and second frames can be individually assembled at the same time, thereby reducing the assembly time. Furthermore, the first and second frames and the printed circuit board assembly are integrated by the coupling unit to form a single assembly. Thus, the components can be easily managed in the single assembly. In addition, the output controlling method of the mobile terminal controls the outputs of the first and second display modules according to the arrangement state of the terminal, thereby outputting the visual information according to a usage state of the user.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalents of such metes and bounds are therefore intended to be embraced by the appended claims.

What is claimed is:

1. A mobile terminal, comprising:
   a main body having a wireless communication module;
   a first display module disposed on a front surface of the main body and configured to display first information;
   a first input unit of a touch type including a touch pad, disposed on the front surface of the main body and configured to input first information into the mobile terminal;
   a second display module disposed on a rear surface of the main body and configured to display second information;
   a second input unit of a push type disposed on the rear surface of the main body and configured to input second information so as to control the second display module;
   a control unit configured to control the wireless communication module, the first and second display modules, and the first and second input units; and
   a power supplying unit disposed at an inner space of the main body, the power supplying unit being disposed between the touch pad and the second input unit so as to be overlapped with the first and second input units, and the power supplying unit being configured to supply power to the control unit.

2. The mobile terminal according to claim 1, wherein the second display module has a display area larger than that of the first display area.

3. The mobile terminal according to claim 1, wherein the first input unit comprises at least one of numerical keys, alphabetical keys, functional keys and directional keys.

4. The mobile terminal according to claim 1, wherein the second input unit has an input area smaller than that of the first input unit.

5. The mobile terminal according to claim 1, wherein the second input unit comprises at least one of functional keys and directional keys.

6. The mobile terminal according to claim 1, wherein said power supplying unit is fixedly coupled to the inside of the main body and a terminal of the power supplying unit is exposed through the main body.

7. The mobile terminal according to claim 1, further comprising:
   a power supplying unit receiving portion formed between the front and rear surfaces and configured to receive the power supplying unit; and
   an opened portion through which the power supplying unit is inserted into the receiving portion formed in the main body.

8. The mobile terminal according to claim 7, wherein the opened portion is formed on one of side surfaces connecting the front and rear surfaces of the main body.

9. The mobile terminal according to claim 1, further comprising:
   a state sensing unit electrically connected to the control unit and configured to sense an arrangement state of the main body and to input the arrangement state to the control unit.

10. The mobile terminal according to claim 9, wherein the state sensing unit comprises a gyro-sensor to sense the arrangement of the main body.

11. A mobile terminal, comprising:
    a first housing through which a first display module and a first input unit are exposed;
    a second housing through which a second display module and a second input unit are exposed;
    a printed circuit board assembly disposed at an inner space formed by connecting and surrounding of the first and second housings and configured to electrically control the first and second display modules and the first and second input units; and
    a power supplying unit disposed at the inner space, the power supply unit being located between the first and second input units so as to be overlapped by the first and second input units, and the power supply unit being configured to supply power to the printed circuit board assembly.

12. The mobile terminal according to claim 11, further comprising:
    at least one frame disposed at the inner space.

13. The mobile terminal according to claim 12, wherein at least one of the first display module, the first input unit and the second display module are mounted on the at least one frame.

14. The mobile terminal according to claim 12, wherein the at least one frame includes a first frame and a second frame disposed at the inner space, and
    wherein the first display module and the first input unit are mounted on the first frame and the second display module is mounted on the second frame.

15. The mobile terminal according to claim 11, wherein the second input unit is disposed to be exposed through the second housing and configured to control the second display module.

16. The mobile terminal according to claim 1, wherein the first and second display modules are located adjacent to one end of the main body, and the first and second input units are located adjacent to the other end of the main body along a lengthwise direction of the main body.

17. The mobile terminal according to claim 1, wherein the control unit includes a plurality of printed circuit boards disposed at an inner space formed in the main body, and
    wherein one of the plurality of printed circuit boards is located to space the power supplying unit in a direction orthogonal to a thickness direction of the main body.

18. The mobile terminal according to claim 17, wherein one of the plurality of printed circuit boards is located to overlap at least one of the first and second input units.

* * * * *